US010654378B2

(12) United States Patent  
Pons (10) Patent No.: US 10,654,378 B2  
(45) Date of Patent: May 19, 2020

(54) ACTUATOR AND CABIN SEAT COMPRISING SUCH AN ACTUATOR

(71) Applicant: ZODIAC ACTUATION SYSTEMS, Paris (FR)

(72) Inventor: Sylvain Pons, Paris (FR)

(73) Assignee: ZODIAC ACTUATION SYSTEMS, Auxerre (FR)

( * ) Notice: Subject to any disclaimer, the term of this patent is extended or adjusted under 35 U.S.C. 154(b) by 967 days.

(21) Appl. No.: 15/110,542

(22) PCT Filed: Jan. 9, 2015

(86) PCT No.: PCT/EP2015/050339  
§ 371 (c)(1),  
(2) Date: Oct. 4, 2016

(87) PCT Pub. No.: WO2015/104378  
PCT Pub. Date: Jul. 16, 2015

(65) Prior Publication Data  
US 2018/0105072 A1  Apr. 19, 2018

(30) Foreign Application Priority Data  
Jan. 10, 2014  (FR) ...................................... 14 50191

(51) Int. Cl.  
*B60N 2/02* (2006.01)  
*B64D 11/06* (2006.01)  
(Continued)

(52) U.S. Cl.  
CPC ............. *B60N 2/0296* (2013.01); *B60N 2/06* (2013.01); *B64D 11/064* (2014.12);  
(Continued)

(58) Field of Classification Search  
CPC .................... B60N 2/0296; B60N 2/06; B60N 2002/0236; B64D 11/06395;  
(Continued)

(56) References Cited

U.S. PATENT DOCUMENTS 3,329,243 A   7/1967  Gibb  
5,007,511 A * 4/1991  Ostrander ............... F16D 59/00  
                                                   192/223

(Continued)

FOREIGN PATENT DOCUMENTS

FR           1505957 A    12/1967

*Primary Examiner* — Vicky A Johnson  
(74) *Attorney, Agent, or Firm* — Polsinelli PC (57) ABSTRACT

This actuator comprises a frame, a motor, an output shaft, and a drive train for driving the output shaft via the motor. The drive train comprises an upstream element, a downstream element, and a device for coupling the upstream element to the downstream element. Said coupling device has a first configuration for transmitting all of the torque exerted by one of the upstream and downstream elements on the coupling device to the other of the upstream and downstream elements when said torque is below a threshold torque, and a second configuration for diverting at least part of said torque exerted by one of the upstream and downstream elements on the coupling device to the frame when said torque is at least equal to the threshold torque.

18 Claims, 5 Drawing Sheets

(51) Int. Cl.
   *B60N 2/06*      (2006.01)
   *F16D 41/08*     (2006.01)
   *F16D 43/02*     (2006.01)
   *F16D 125/48*    (2012.01)

(52) U.S. Cl.
   CPC ...... *B64D 11/06395* (2014.12); *F16D 41/082* (2013.01); *F16D 43/02* (2013.01); *B60N 2002/0236* (2013.01); *F16D 2125/48* (2013.01)

(58) Field of Classification Search
   CPC ..... B64D 11/064; F16D 41/082; F16D 43/02; F16D 2125/48
   See application file for complete search history.

(56) References Cited

U.S. PATENT DOCUMENTS

| | | | |
|---|---|---|---|
| 7,528,563 B2 * | 5/2009 | Thoreux | B60N 2/0224 297/344.11 |
| 2002/0101106 A1 * | 8/2002 | Kim | B60N 2/0224 297/362.11 |
| 2009/0145714 A1 * | 6/2009 | Lampert | F16D 41/10 192/43.2 |
| 2018/0105072 A1 * | 4/2018 | Pons | B64D 11/064 |

\* cited by examiner

ACTUATOR AND CABIN SEAT COMPRISING SUCH AN ACTUATOR

CROSS REFERENCE TO RELATED APPLICATIONS

This application is a National Phase filing under 35 U.S.C. § 371 of PCT/EP2015/050339 filed on Jan. 9, 2015; and this application claims priority to Application No. 1450191 filed in France on Jan. 10, 2014 under 35 U.S.C. § 119. The entire contents of each application are hereby incorporated by reference.

The present invention relates to actuator, of the type comprising a frame, a motor, an output shaft and a drive train for driving the output shaft via the motor, the drive chain comprising an upstream element kinematically connected to the rotor of the motor such that the rotor and said upstream element rotate jointly around their respective rotation axes, a downstream element kinematically connected to the output shaft such that the output shaft and said downstream element rotate jointly around their respective rotation axes, and a coupling device for coupling the upstream element to the downstream element.

The invention also relates to a cabin seat for an aircraft, comprising a plurality of elements that are movable relative to one another, and an actuator to move at least part of said moving elements relative to one another, in which the actuator is of the aforementioned type.

The passenger seats arranged in airplanes are commonly equipped with electrical actuators making it possible to move different moving elements of the seat relative to one another.

To ensure passenger safety during critical takeoff or landing phases, it is mandatory for the seats to be able to have a sufficient stiffness, preventing the seat from deforming or separating from the rest of the vehicle in case of violent impact. Yet the inertia alone of the actuators connecting the different elements of the seat is not always sufficient to meet these strengths constraints in case of impact. Furthermore, there are major risks of breaks in the control-gearing trains of the actuators.

Thus, it is known to immobilize certain parts of the seat relative to one another using bolts during critical flight phases of the vehicle. These bolts are for example made up of the moving core of an electromagnet whereof the winding is supported by a moving part of the seat and the moving core is movable between a retracted position and a deployed position for which it is engaged in the fixed part of the seat, thus ensuring positive mechanical blocking of the movement of the two parts of the seat relative to one another.

However, the use of these bolts makes the seat heavier and complicates the control thereof. Furthermore, in light of the machining allowances of the seat and the actuators, and possible unintentional actions by the passenger on the seat, some bolts may not be aligned with their respective strikes, which prevents the movement of those bolts toward their deployed positions.

One aim of the invention is to allow simplified locking of the elements of the seat. Other aims are to allow more reliable locking of the elements of the seat and to limit the extent to which the seat is made heavier.

To that end, the invention relates to an actuator of the aforementioned type, wherein said coupling device has a first configuration for transmitting all of the torque exerted by one of the upstream and downstream elements on the coupling device to the other of the upstream and downstream elements when said torque is below a threshold torque, and a second configuration for diverting at least part of said torque exerted by one of the upstream and downstream elements on the coupling device to the frame when said torque is at least equal to the threshold torque.

According to preferred embodiments of the invention, the actuator has one or more of the following features, considered alone or according to any technically possible combination(s):

- the coupling device is a passive device,
- the coupling device comprises at least one coupling member movable between a first position separated from a bearing surface of the frame when the coupling device is in the first configuration, and a second position bearing against the bearing surface when the coupling device is in the second configuration,
- the or each coupling member has a bearing surface against the upstream element and a bearing surface against the downstream element,
- a first element among the upstream and downstream elements has, for the or each coupling member, a respective housing for receiving the coupling member in its first position,
- the second element among the upstream and downstream elements comprises a body and at least one lug protruding from the body parallel to the rotation axis of the second element, said lug being received in a cavity able to be arranged in the first element, said cavity communicating with at least one coupling member housing, the coupling member associated with said housing having a bearing surface against the lug,
- the first element has a wall separating the receiving cavity of the lug from the coupling member housing, the cavity communicating with said housing via at least one through orifice arranged through said wall, and the coupling member associated with said housing comprises a body having a shape substantially complementary to that of the housing and a finger extending through the through orifice, from the housing to the inside of the cavity, said finger supporting the bearing surface against the second element,
- the second element comprises a plurality of lugs protruding from the body parallel to the rotation axis of the second element, said lugs being distributed angularly and regularly around the rotation axis,
- the or each lug is angularly framed by two coupling members each having a bearing surface against said lug,
- the housing emerges in a peripheral outer envelope of the first element, the housing flaring radially toward the outside of the first element,
- the coupling device comprises at least four coupling members distributed angularly around the rotation axis of the downstream element,
- wherein the upstream and downstream elements are each mounted rotatably around rotation axes coaxial to one another,
- the downstream element is mounted rotatably around the rotation axis coaxial to the output shaft and is secured in rotation around its axis to the output shaft.

The invention also relates to a passenger seat of the aforementioned type, wherein the actuator is an actuator as defined above.

Other features and advantages of the invention will appear upon reading the following description, provided solely as an example and done in reference to the appended drawings, in which.

Figure 1:
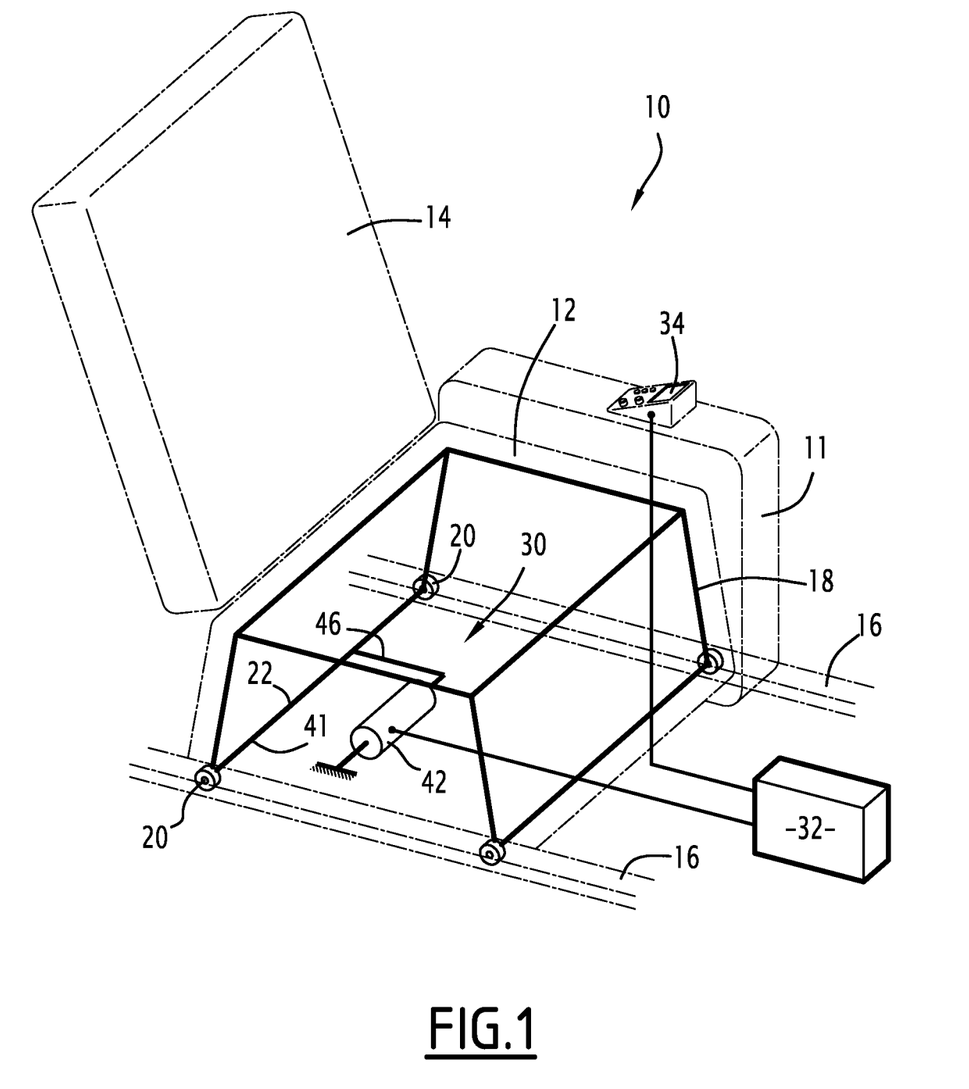
FIG. 1 is a diagrammatic perspective view of a cabin seat according to the invention.

The seat 10 shown in FIG. 1 includes a frame 11, as well as a seat bottom 12 and a backrest 14 mounted movably relative to the frame 11. It also includes two racks 16 fastened to the floor of the cabin and along which the frame 11 is mounted sliding by means of a leg assembly 18.

In particular, the leg assembly 18 comprises two wheels 20 each meshing on one of the racks 16. Said wheels 20 are suitable for moving relative to the racks 16 jointly with the frame 11. With the racks 16, they form means for moving the seat 10 relative to the floor of the cabin.

The wheels 20 are mounted at the axial end of a transmission shaft 22, so as to frame said shaft 22. They are secured to the transmission shaft 22.

The transmission shaft 22 is mounted rotatably around its axis relative to the frame 11.

An actuator 30 is connected to the leg assembly 18 to ensure the movement of the leg assembly 18 along the length of the racks 16. The actuator 30 is connected to a central control unit 32, which in turn is connected to a keyboard 34 allowing the passengers seated on the seat 10 to move the latter by controlling the actuator 30.

In particular, the actuator 30 is suitable for rotating the wheels 20 around their axes. To that end, the actuator 30 comprises, in reference to FIG. 2, a cover 40, secured to the frame 11, a motor 42, an output shaft 44, and a drive train 46 for driving the output shaft 44 via the motor 42.

Figure 2:
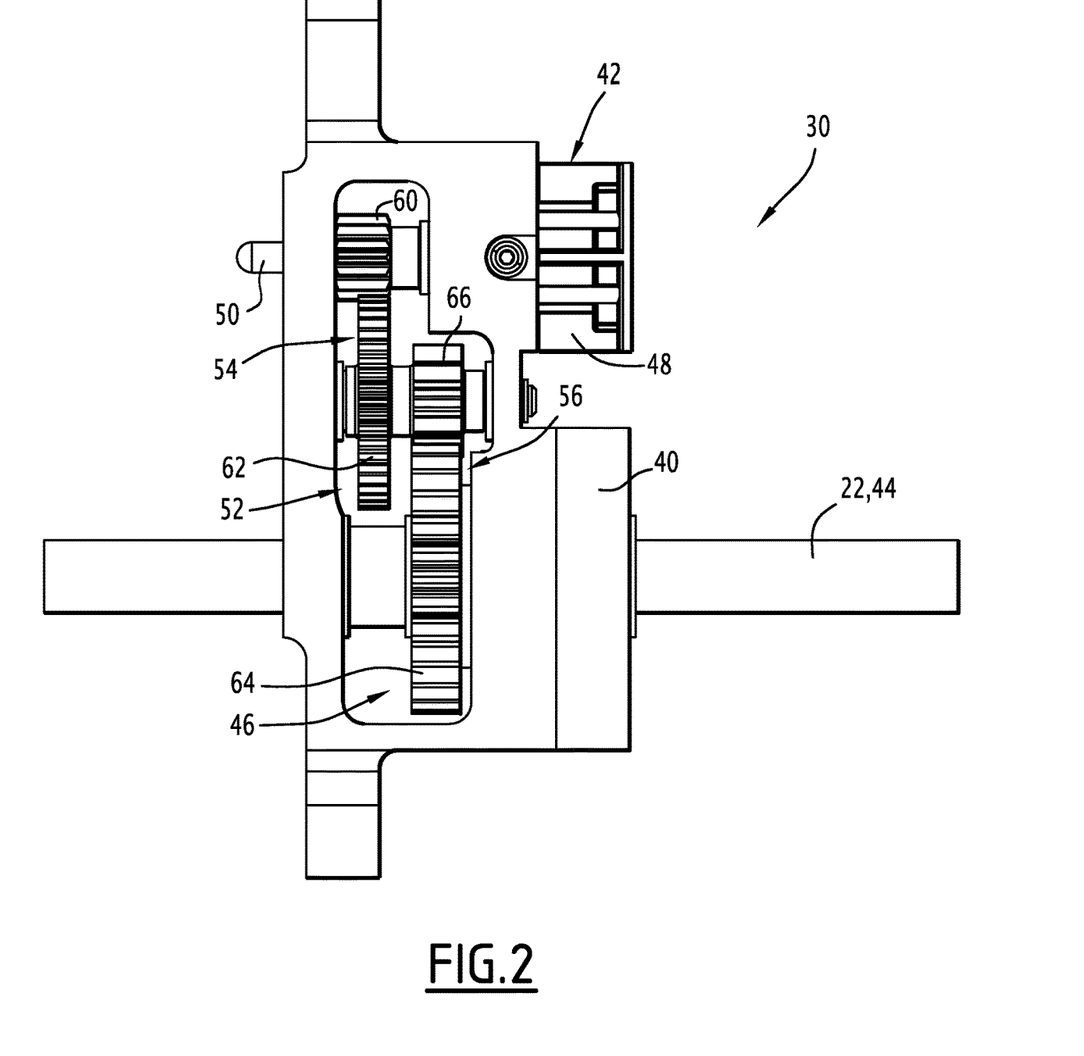
FIG. 2 is an elevation view of an actuator of the passenger seat of FIG. 1.

The output shaft 44 is made up of the transmission shaft 22.

The cover 40 is made from a relatively deformable material, for example aluminum.

The motor 42 is an electric motor. It includes, in a known manner, a rotor (not shown) and a stator (not shown) that are housed in a case 48 secured to the cover 40, as well as an output shaft 50 secured to the rotor. Preferably, it also comprises a zero current break, suitable for immobilizing the rotor relative to the stator when the motor 42 is not supplied with electric current.

The drive train 46 comprises a control-gearing train 52 suitable for kinematically linking the transmission shaft 22 to the output shaft 50 such that the rotation speed of the transmission shaft 22 around its axis is lower than the rotation speed of the output shaft 50 around its axis.

The control-gearing train 52 comprises a plurality of gearing down ranges 54, 56. Each gearing down range 54, 56 comprises a plurality of meshing elements 60, 62, 64, 66.

The meshing elements of the first gearing down range 54 comprise an input pinion 60, secured in rotation with the output shaft 50, as well as a transmission pinion 62 on which the input pinion 60 meshes. This transmission pinion 62 is mounted rotatably around its axis on the cover 40, is oriented substantially parallel to the input pinion 60, and has a number of teeth greater than that of the input pinion 60.

The meshing elements of the last gearing down range 56 comprise an output pinion 64, coaxial to the output shaft 22, as well as an intermediate pinion 66 on which the output pinion 64 meshes. This intermediate pinion 66 is mounted rotatably around its axis on the cover 40, is oriented substantially parallel to the output pinion 64, and has a number of teeth smaller than that of the output pinion 64.

In the illustrated example, the intermediate pinion 66 is secured in rotation with the transmission pinion 62. Alternatively, at least one intermediate gearing down range is inserted between the transmission pinion 62 and the intermediate pinion 66, so as to kinematically link these two pinions 62, 66 such that they rotate jointly around their respective axes.

The output pinion 64 is thus kinematically linked to the rotor of the motor 42, such that the rotor and said output pinion 64 rotate jointly around their respective rotation axes.

Each meshing element 60, 62, 64, 66 is formed from a relatively rigid material, for example steel, preferably nitrided steel.

Figure 3:
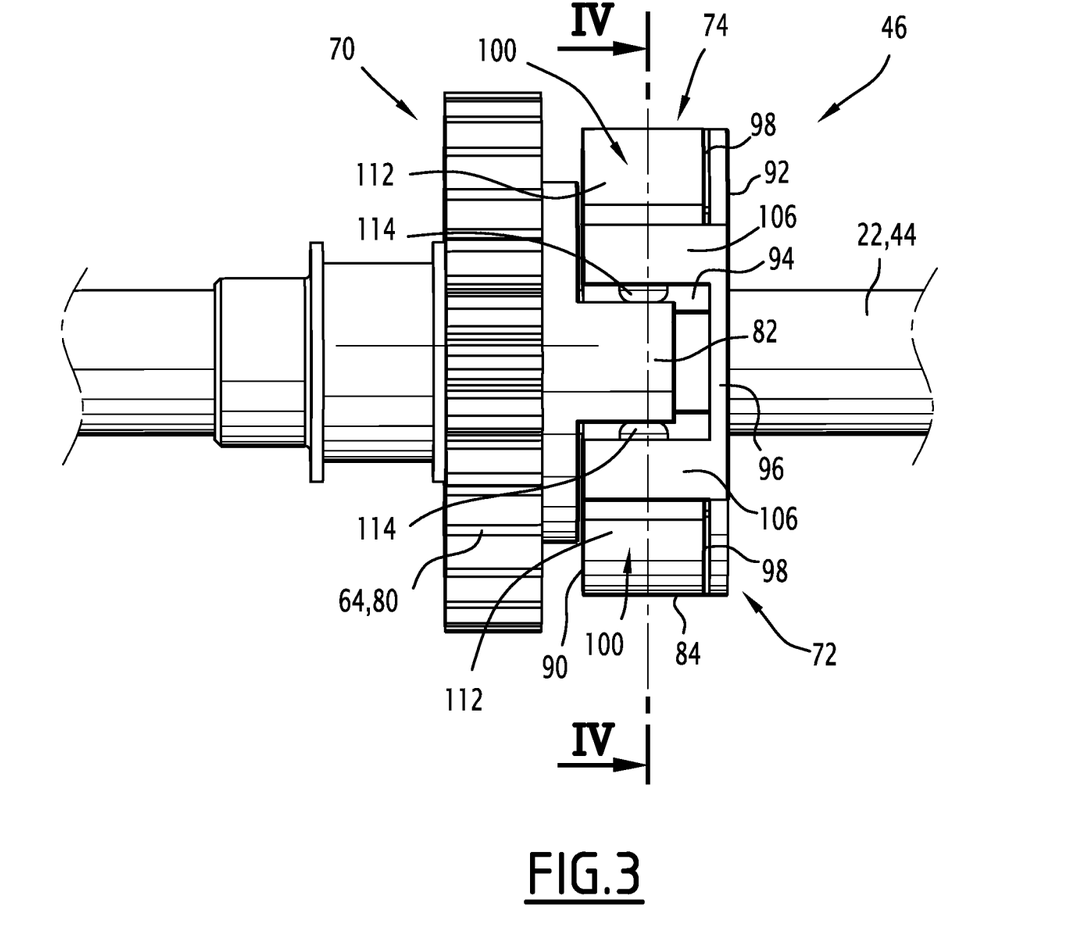
FIG. 3 is an elevation view of part of the actuator of FIG. 2.

In reference to FIG. 3, the drive train 46 also comprises an upstream element 70, kinematically connected to the rotor of the motor 42 such that the rotor and said upstream element 70 rotate jointly around their respective rotation axes, a downstream element 72, kinematically connected to the transmission shaft 22 such that the transmission shaft 22 and said downstream element 72 rotate jointly around their respective rotation axes, and a coupling device 74 for coupling the upstream element 70 to the downstream element 72.

Each of the upstream 70 and downstream 72 elements is mounted rotatably relative to the cover 40 around the rotation axis of said element 70, 72. The rotation axes of the upstream 70 and downstream 72 elements are coaxial to one another. In particular, said axes are also coaxial to the transmission shaft 22.

The upstream element 70 comprises a body 80 and two lugs 82 protruding axially from the body 80, toward the downstream element 72. The body 80 is made up of the output pinion 64. The two lugs 82 are positioned symmetrically relative to one another with respect to the rotation axis of the upstream element 70.

Alternatively, the upstream element 70 comprises at least three lugs 82 distributed angularly and regularly around the rotation axis of the upstream element 70, i.e., distributed angularly around the rotation axis such that, for each pair of consecutive lugs 82, the angle between said lugs 82 is equal to the angle between the lugs 82 of each other pair of consecutive lugs 82.

The upstream element 70 is rotatable around its axis relative to the transmission shaft 22.

The upstream element 70 is preferably in a single piece. It is made from a relatively rigid material, for example steel, preferably nitrided steel.

The downstream element 72 is secured in rotation around its axis relative to the transmission shaft 22.

The downstream element 72 is invariant by rotation by a predetermined angle around its rotation axis. In the illustrated example, said predetermined angle is equal to 180°.

Figure 4:
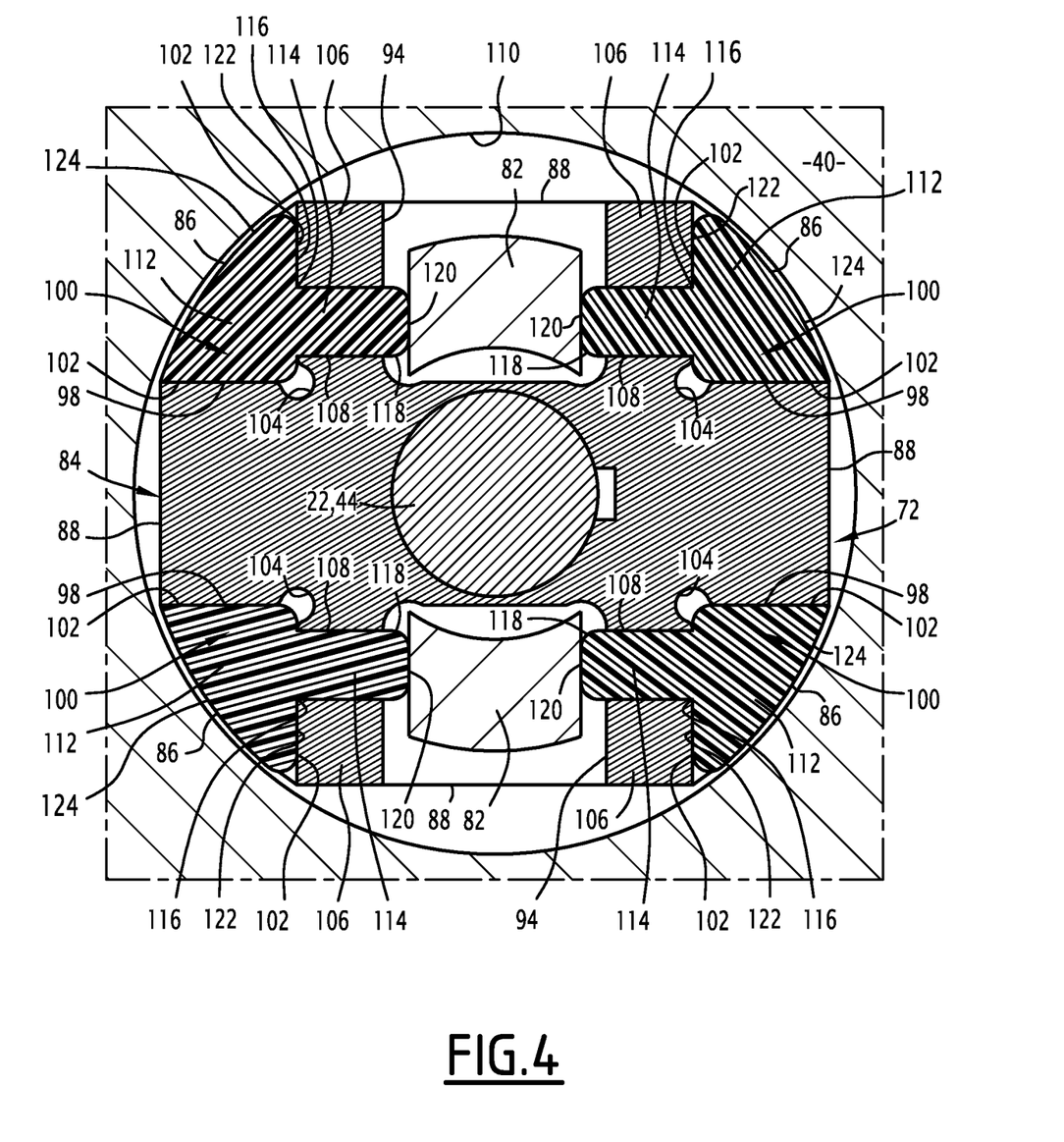
FIG. 4 is a sectional view of the actuator along the plane marked IV-IV in FIG. 3, the actuator being in a first configuration.

In reference to FIG. 4, the downstream element 72 is contained in an outer peripheral envelope 84 extending around the rotation axis of the downstream element 72 and housing the downstream element 72.

This outer peripheral envelope 84 comprises cylindrical sectors of revolution 86 all having the same radius. Each cylinder sector 86 in particular has an axis substantially parallel to the rotation axis of the downstream element 72 and slightly offset relative to said rotation axis. "Slightly offset" means that the distance from the axis of each cylinder sector 86 to the rotation axis of the downstream element 72 is smaller than 1 mm, preferably comprised between 0.3 and 0.7 mm.

These cylinder sectors are preferably, as shown, connected to one another by planar portions 88 oriented parallel to the rotation axis of the downstream element 72, each planar portion 88 extending between two consecutive cylindrical sectors 86, such that the outer peripheral envelope is formed by alternating cylinder sectors 86 and planar portions 88. In particular, in the illustrated example, the number of cylinder sectors 86 is equal to four, the number of planar portions 88 is equal to four, and each planar portion 88 is perpendicular to two other planar portions 88.

Returning to FIG. 3, the downstream element 72 comprises two large faces 90, 92, opposite one another and each extending substantially perpendicular to the rotation axis of the downstream element 72. A first large face 90 is oriented toward the upstream element 70, and the second large face 92 is oriented opposite the upstream element 70.

Each large face 90, 92 is bordered by the envelope 84.

The downstream element 72 has, for each lug 82 of the upstream element 70, a cavity 94 capable of receiving said lug 82. Said cavity 94 emerges in the first large face 90. In the illustrated example, it further emerges in the envelope 84, in particular in a planar portion 88 of the envelope 84.

In the illustrated example, a bottom wall 96 closes the cavity 94 on the side of the second large face 92.

The cavity 94 has an angular width larger than the angular width of the lug 82 that it receives. The lug 82 can thus move angularly in the cavity 94.

The downstream element 72 further has housings 98 for coupling members 100 of the coupling device 74.

In reference to FIG. 4, each housing 98 emerges in the envelope 84, in particular in a cylinder sector 86 of the envelope 84. In the illustrated example (FIG. 3), each housing 98 further emerges in the first large face 90, and is closed by the bottom wall 96 on the side of the second large face 92.

Each housing 98 flares radially toward the outside of the downstream element 72. In other words, each housing 98 flares as it moves away from the rotation axis of the downstream element 72.

In particular, each housing 98 is angularly bordered by two contact faces 102 against the coupling member 100 housed in said housing 98, said faces 102 coming together in a bottom 104 of the housing 98, and diverging from one another from said bottom 104 to said envelope 84. Each face 102 is in particular planar. In the illustrated example, the faces 102 are oriented substantially perpendicular to one another.

Each housing 98 is substantially in the shape of a cylinder sector of revolution.

Each cavity 94 is angularly framed by two housings 98. The lug 82 that is received therein is therefore angularly framed by the coupling members 100 housed in said housings 98.

Each cavity 94 is separated from each of the housings 98 framing it by a wall 106 of the downstream element 72.

A through orifice 108 extends through the wall 106. It emerges in the cavity 94 and in the housing 98 separated from the cavity 94 by said wall 106. The axis of the orifice 108 is oriented toward the portion of the envelope 84 where the housing 98 emerges.

In the illustrated example, there are four housings 98, each housing 98 emerging in a cylinder sector 86 specific to the envelope 84. Two of the housings 98 angularly frame one of the cavities 94, and the other two housings 98 angularly frame the other cavity 94.

The downstream element 72 is preferably in a single piece. It is preferably made from a relatively deformable material, for example aluminum. Alternatively, the downstream element 72 is made from a relatively rigid material, for example steel, preferably nitrided steel, to withstand the stresses that it experiences.

The cover 40 has an annular bearing surface 110 extending around the downstream element 72. Said bearing surface 110 is centered on the rotation axis of the downstream element 72, and has a radius substantially equal to the radius of the cylinder sectors 86 of the envelope 84.

The coupling members 100 are equal in number to the number of housings 98. In the illustrated example, there are there for four of them.

The coupling members 100 are angularly distributed around the rotation axis of the upstream 70 and downstream 72 elements.

Each coupling member 100 comprises a body 112 having a shape substantially complementary to that of the housing 98 in which it is received, and a finger 114 protruding from the body 112.

The body 112 is housed at least partially in said housing 98. The finger 114 extends through the through orifice 108 connecting said housing 98 to the cavity 94 that it partially frames. In particular, the finger 114 extends into the cavity 94.

The finger 114 has an end 116 for connecting to the body 112, and a free end 118 opposite the connecting end 116. The free end 118 forms a bearing face 120 against the lug 82 received in the cavity 94.

The body 112 has a bearing surface 122 against the downstream element 72. Said bearing surface 122 marries the walls 96, 106 of the housing 98.

The body 112 further has a bearing surface 124 against the bearing surface 110 of the cover 40. Said bearing surface 124 is in the shape of a cylinder sector of revolution having a curve radius substantially equal to the radius of the bearing surface 110.

The bearing surface 124 is in particular knurled, so as to increase the friction forces between the bearing surface 124 and the bearing surface 110 when these two surfaces 110, 124 are in contact with one another. Preferably, the bearing surface 124 is knurled so as to form axial furrows (not shown) on the bearing surface 124.

The material of each coupling number 100 is typically made from a relatively rigid material, for example steel.

Each coupling member 100 is forcibly mounted on the downstream element 72, in a first position separated from the bearing surface 100 of the cover 40, as shown in FIG. 4. "Forcibly mounted" means that the finger 114 of each coupling member 100 is engaged in the corresponding through orifice 108 such that the friction forces between the finger 114 and the through orifice 108 suffice to keep the coupling member 100 in its first position under normal usage conditions of the actuator 30. Each coupling member 100 is for example banded on the downstream element 72 in said first position.

When the coupling member 100 is in the first position, its bearing surface 124 is flush with the envelope 84.

Preferably, the lengths of the fingers 114 are chosen such that, when the two coupling members 100 framing a same lug 82 are in the first position, the bearing surfaces 120 of the two coupling members 100 rest against said lug 82.

When each coupling member 100 is in its first position, the coupling device 74 is in a first configuration for transmitting all of the torque exerted by one of the upstream 70 and downstream 72 elements on the coupling device 74 toward the other of the upstream 70 and downstream 72 elements.

Figure 5:
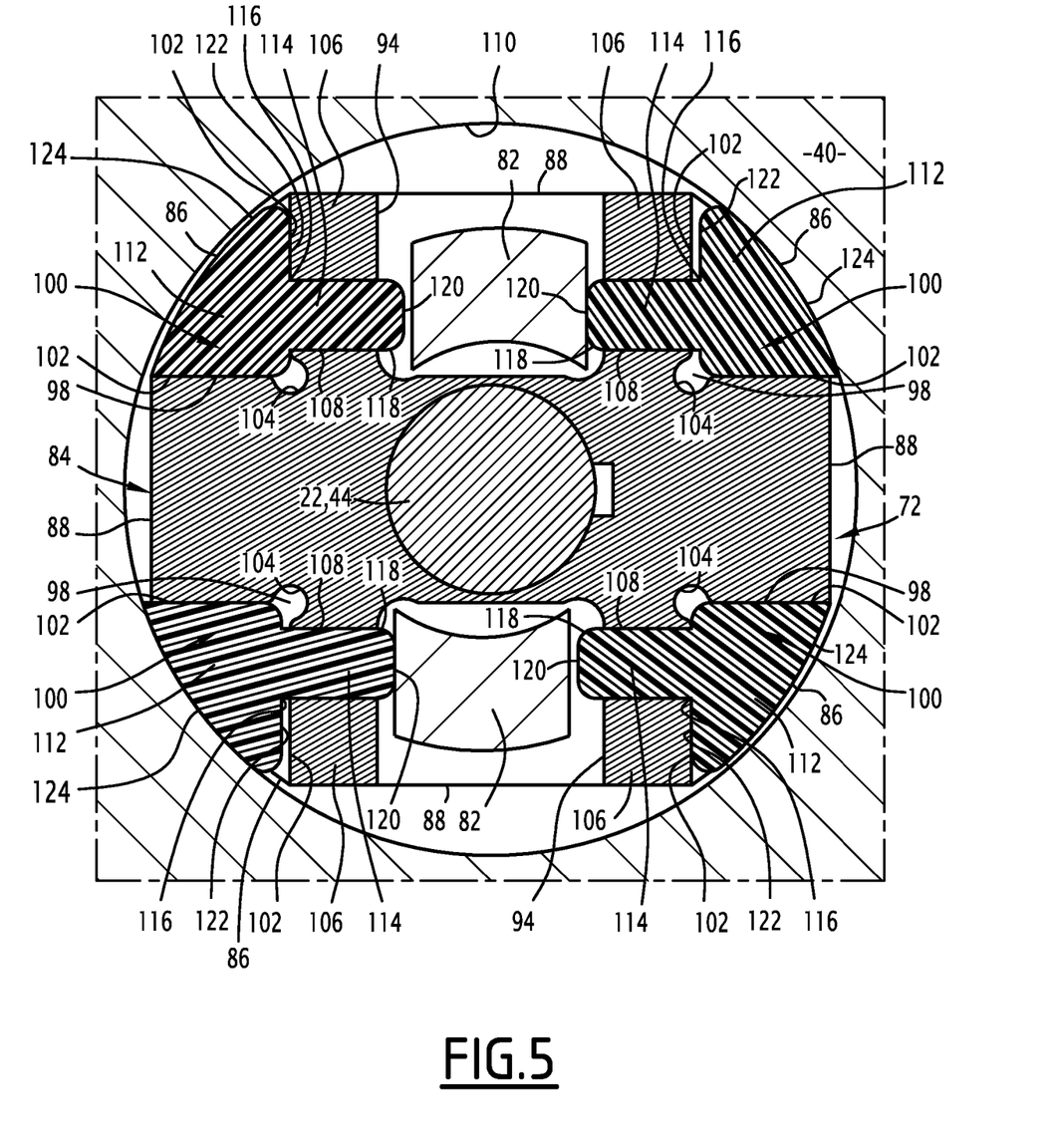
FIG. 5 is a view identical to that of FIG. 4, the actuator being in a second configuration.

Each coupling member 100 is nevertheless movable into a second position bearing against the bearing surface 100 of the cover 40, as shown in FIG. 5, when the torque transferred to the coupling members 100 via the contact surfaces 102 is greater than or equal to a threshold torque. This threshold torque is the torque beyond which the force exerted by each lug 82 on the coupling member 100 against which it bears is greater than the friction forces between the finger 114 of the coupling member 100 and the corresponding through orifice 108. This threshold torque is predetermined. The diameters of the fingers 114 of the coupling members 100 and through orifices 108 of the downstream element 72 are sized so as to obtain this predetermined threshold torque.

The threshold torque is comprised between the static strength torque and the failure torque of the control-gearing train 52.

The failure torque of the control-gearing train 52 is the torque at which the meshing element of the control-gearing train 52 breaks, such that there is then no longer any transmission of torque between the upstream and downstream ends of the control-gearing train 52.

The static strength torque of the control-gearing train 52 is the torque from which at least one meshing element of the control-gearing train 52 forms, the torque continuing to be transmitted from one end of the control-gearing train 52 to the other. The static strength torque is typically equal to approximately 80% of the failure torque.

When a coupling member 100 is in its second position, it protrudes outside the envelope 84 and its bearing surface 124 rests on the bearing surface 110 of the cover 40.

When at least one of the members 100 is in its second position, the coupling device 74 is in a second configuration for deviating part of the torque exerted by one of the upstream 70 and downstream 72 elements on the coupling device 74 toward the cover 40.

The switching of the coupling device 74 from its first to its second configuration occurs in the manner described below.

The torque of the downstream elements 72 is normally transmitted to the upstream elements 70 as follows: the torque is transferred to the coupling members 100 via the contact surfaces 102, and is redistributed to the upstream member via bearing surfaces 120. In return for the force exerted by the coupling members 100 on the lugs 82 to transmit the torque to the upstream elements 70, each lug 82 exerts a reaction force on the bearing surface 120 of one of the coupling members 100 that frame it. This reaction force is oriented parallel to the axis of the through orifice 108 connecting the cavity 94 receiving the lug 82 to the housing 98 of said coupling member. The reaction force is therefore oriented toward the portion of the envelope 84 in which the housing 98 emerges, and consequently tends to push the coupling member 100 outside its housing 98. The friction forces between the downstream element 72 and the coupling member 100 nevertheless oppose the latter from leaving its housing 98.

When the torque transmitted by the coupling device 74 to the upstream element 70 reaches the predetermined threshold torque, the reaction force exerted by the lug 82 exceeds the friction forces, such that the coupling member 100 is pushed outside its housing 98 until it abuts against the bearing surface 110 of the cover 40. At the same time, the downstream element 72 rotates around its axis relative to the upstream element 70. Only a limited torque then continues to be transferred to the upstream element 70, the rest of the torque being transferred to the cover 40 via the bearing surfaces 110 and 124.

It will be noted that the switching of the coupling device 74 from its first to its second configuration is done passively, such that the coupling device 74 can be qualified as a passive device.

When the coupling device 74 is in its second configuration, it can no longer return to the first configuration. The actuator 30 is then unusable.

Owing to the invention described above, the locking of the seat 10 is done simply. Indeed, once the actuator 30 is stopped, any movement of the wheels 20 is impossible: the zero current brake of the motor 42 indeed prevents any rotation of the rotor when stopped, and therefore of the parts, including the wheels 20, that are kinematically linked to it.

Furthermore, the locking of the seat 10 is reliable. Indeed, if the torque exerted on the wheels 20 is too great to be borne by the control-gearing train 52, this torque is partially transmitted to the cover 40 of the actuator 30. This makes it possible to avoid breaking the control-gearing train 52, which, by separating the wheels 20 from the motor 42, would free the rotation of the wheels 20.

Lastly, the seat 10 is only made very slightly heavier by the actuator 30 relative to a traditional actuator.

The invention claimed is:

1. An actuator comprising a frame, a motor, an output shaft, and a drive train for driving of the output shaft by the motor, the drive train comprising an upstream element, kinematically connected to the rotor of the motor such that the rotor and said upstream element rotate jointly around their respective rotation axes, a downstream element, kinematically connected to the output shaft such that the output shaft and said downstream element rotate jointly around their respective rotation axes, and a coupling device for coupling the upstream element to the downstream element, said coupling device having a first configuration for transmitting all of the torque exerted by one of the upstream element and the downstream element on the coupling device toward the other of the upstream element and the downstream element when said torque is below a threshold torque, and a second configuration for deviating at least part of said torque exerted by one of the upstream element and downstream element on the coupling device toward the frame when said torque is at least equal to the threshold torque, said frame having an annular bearing surface extending around the downstream element; said bearing surface being centered on the rotation axis of the downstream element; the coupling device comprising at least one coupling member movable between a first position separated from said bearing surface of the frame when the coupling device is in the first configuration, and a second position bearing against said bearing surface when the coupling device is in the second configuration, the or each coupling member has a first bearing surface bearing against the upstream element and a second bearing surface bearing against the downstream element one of the upstream element and the downstream element constituting a first element, the other one of the upstream element and downstream element constituting a second element, and the first element has, for the or each coupling member, a respective coupling member housing for receiving the coupling member in its first position.

2. The actuator according to claim 1, wherein the coupling device is a passive device.

3. The actuator according to claim 1, wherein the or each coupling member is forcibly mounted on the first element in its first position.

4. The actuator according to claim 3, wherein the second element comprises a body and at least one lug protruding from the body parallel to the rotation axis of the second element, said lug being received in a respective cavity arranged in the first element, said cavity communicating with at least one coupling member housing, the first bearing surface of the coupling member received in said coupling member housing bearing against the lug.

5. The actuator according to claim 1, wherein the second element comprises a body and at least one lug protruding from the body parallel to the rotation axis of the second element, said lug being received in a respective cavity arranged in the first element, said cavity communicating with at least one coupling member housing, the first bearing surface of the coupling member received in said coupling member housing bearing against the lug.

6. The actuator according to claim 5, wherein the first element has a wall separating the cavity receiving the lug from the coupling member housing, the cavity communicating with said coupling member housing via at least one through orifice arranged through said wall, and the coupling member associated with said coupling member housing comprises a body having a shape substantially complementary to that of the coupling member housing and a finger extending through the through orifice, from the coupling member housing to the inside of the cavity, said finger supporting the first bearing surface of the coupling member.

7. The actuator according to claim 6, wherein the second element comprises a plurality of lugs protruding from the body parallel to the rotation axis of the second element, said lugs being distributed angularly and regularly around the rotation axis.

8. The actuator according to claim 6, wherein the or each lug is angularly framed by two coupling members whose first bearing surfaces are able to bear against said lug.

9. The actuator according to claim 5, wherein the second element comprises a plurality of lugs protruding from the body parallel to the rotation axis of the second element, said lugs being distributed angularly and regularly around the rotation axis.

10. The actuator according to claim 9, wherein the or each lug is angularly framed by two coupling members whose first bearing surfaces are able to bear against said lug.

11. The actuator according to claim 5, wherein the or each lug is angularly framed by two coupling members whose first bearing surfaces are able to bear against said lug.

12. The actuator according to claim 11, wherein, when the two coupling members framing said same lug are in the first position, the first bearing surfaces of said two coupling members rest against said lug.

13. The actuator according to claim 1, wherein the coupling member housing emerges in a peripheral outer envelope of the first element, the coupling member housing flaring radially toward the outside of the first element.

14. The actuator according to claim 1, wherein the coupling device comprises at least four coupling members distributed angularly around the rotation axis of the downstream element.

15. The actuator according to claim 1, wherein the downstream element is mounted rotatably around a rotation axis coaxial to the output shaft and is secured in rotation around its axis to the output shaft.

16. The actuator according to claim 1, wherein the upstream element and downstream element are each mounted rotatably around rotation axes coaxial to one another.

17. The actuator according to claim 1, wherein each of the upstream element and downstream element is in a single piece.

18. A cabin seat for an aircraft, comprising a plurality of elements that are movable relative to one another, and an actuator to move at least part of said moving elements relative to one another, in which the actuator is an actuator according to claim 1.

* * * * *